United States Patent
Yamada et al.

(10) Patent No.: US 6,480,354 B2
(45) Date of Patent: Nov. 12, 2002

(54) DISK CARTRIDGE, ITS DOOR OPENING AND CLOSING MECHANISM AND DISK DRIVE

(75) Inventors: Takashi Yamada, Kanagawa; Takatsugu Funawatari, Miyagi, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/862,403

(22) Filed: May 21, 2001

(65) Prior Publication Data
US 2001/0028529 A1 Oct. 11, 2001

Related U.S. Application Data

(62) Division of application No. 09/380,162, filed on Nov. 2, 1999.

(30) Foreign Application Priority Data

Feb. 28, 1997 (JP) .............................................. 9-046536
Feb. 28, 1997 (JP) .............................................. 9-046538
Feb. 27, 1998 (WO) ................................ PCT/JP98/00834

(51) Int. Cl.$^7$ .............................................. G11B 17/04
(52) U.S. Cl. ................... 360/99.06; 369/77.2; 369/291; 360/133
(58) Field of Search .............................. 360/99.06, 133, 360/291, 77.2, 97.01, 99.01, 99.04, 99.08; 206/307.1, 38.1, 308.3; 369/77.1, 77.2

(56) References Cited

U.S. PATENT DOCUMENTS

| 5,636,095 A | * 6/1997 | McGrath et al. | 360/133 |
| 6,043,964 A | * 3/2000 | Chiba | 360/133 |
| 6,215,752 B1 | * 4/2001 | Kabasawa | 369/77.2 |

FOREIGN PATENT DOCUMENTS

| JP | 2-172079 | 7/1990 |
| JP | 6-36496 | * 2/1994 |

* cited by examiner

Primary Examiner—Brian E. Miller
Assistant Examiner—Tianjie Chen
(74) Attorney, Agent, or Firm—Frommer Lawrence & Haug LLP; William S. Frommer; Matthew K. Ryan

(57) ABSTRACT

A door 20 is rotatably attached to a disk cartridge 1. In mounting the disk cartridge 1, an opening and closing pin 224 moving along a groove 223 is engaged with the door 20 and the door 20 is opened. For example, when the opening and closing pin 224 cannot return to a normal standby position by some cause, a front face of the door 20 and a projected streak portion 206 are brought into contact with each other and the disk cartridge 1 cannot be inserted further. Therefore, even when the disk cartridge 1 is inserted in a state where the door 20 is not opened, there is avoided beforehand an accident where the disk cartridge 1 collides with a head, a lamp or the like to cause the destruction thereof.

11 Claims, 23 Drawing Sheets

FIG. 6A
FIG. 6B
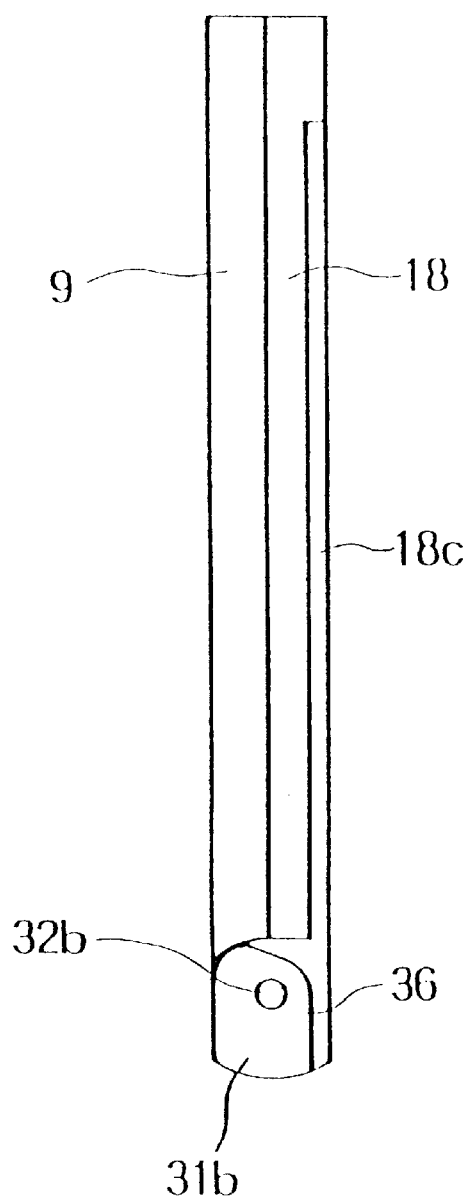
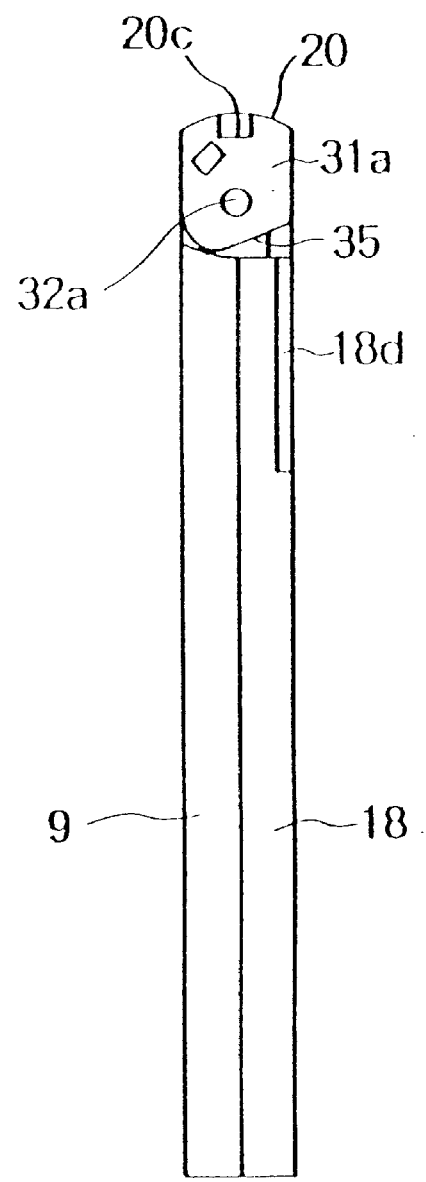

F I G. 7A
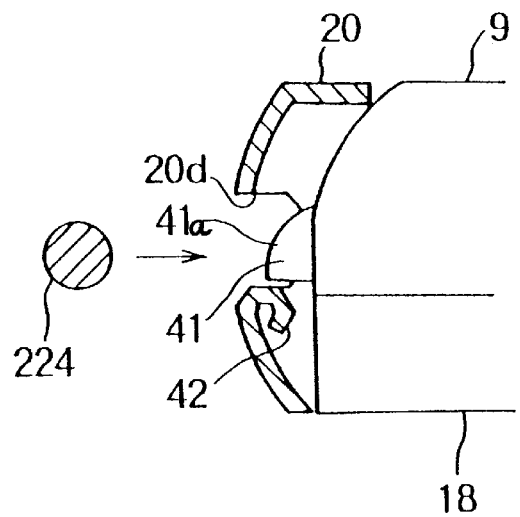
F I G. 7B
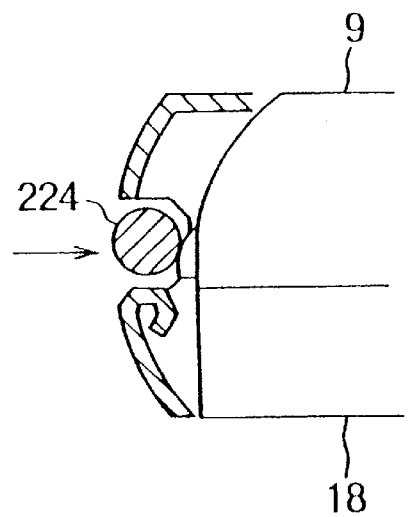
F I G. 7C
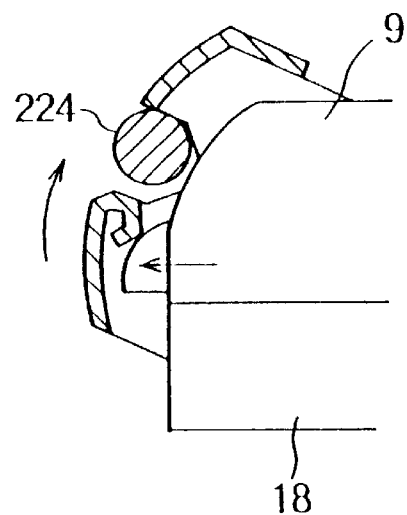

DISK CARTRIDGE, ITS DOOR OPENING AND CLOSING MECHANISM AND DISK DRIVE

This application is a division of application Ser. No. 09/380,162, filed Nov. 2, 1999.

TECHNICAL FIELD

The present invention relates to a disk cartridge including a disk medium capable of recording or reproducing information, more particularly to a disk cartridge in which a door for opening or closing an opening portion for inserting a head thereto is formed as a rotating type one and the door is provided with a notch for passing a projected streak portion for determining opening of the door on the side of a disk drive only when the rotated door reaches a predetermined rotational angle whereby a wide opening portion is provided and the closed door and parts provided at inside of the disk drive can be prevented from colliding with each other.

Further, the present invention relates to a door opening and closing mechanism of a disk cartridge for opening and closing a door of the disk cartridge including a record medium in a disk-like shape, and a disk drive using thereof, more particularly to a door opening and closing mechanism of a disk cartridge in which a door can be opened and closed stably according to the opening of the door by engaging an engaging pin with a side face of the rotating type door of the disk cartridge and moving the engaging pin along a predetermined track in accordance with the advance of the disk cartridge, and a disk drive using thereof.

BACKGROUND ART

There is known a conventional disk cartridge for recording information as shown in, for example, FIGS. 24A and 24B. The disk cartridge 101 is an attachable and detachable cartridge (removable cartridge) containing a record medium in a disk-like shape having a large information capacity used in, for example, an information processing apparatus and FIGS. 24A and 24B show the removable hard disk.

As shown in FIG. 25, according to the conventional disk cartridge 101, a cartridge upper shell 109 and a cartridge lower shell 108 are fastened by fixing screws 112 in a state where they overlap each other. There are contained, at inside thereof, a disk 102 having information recording faces on both upper and lower faces 102*a* and 102*b* thereof and a clamp member 103 attached to the center of the disk 102. As base material of the disk 102, aluminum or glass is generally used.

The clamp member 103 is constituted by a pair of upper and lower pinching plates 104 and 105 and a fixing screw 106 for fastening these. The two pinching plates 104 and 105 pinch the disk 102 from above and from below and are fastened by the fixing screw 106 whereby a surrounding of a center hole 107 of the disk 102 is pinched by the pinching plates 104 and 105. The disk 102 is rotatably contained at inside of the disk cartridge 101.

Further, one side face of the conventional disk cartridge 101 is provided with an opening portion 107 for allowing a recording or reproducing head to be inserted thereinto. There are provided a slide shutter 110 for closing the opening portion 107 to prevent dust and dirt from being entrapped when the disk cartridge 101 is not used, and a return spring 111 for automatically closing the opened side shutter 110.

When signals are recorded to or reproduced from the disk cartridge 101, the disk cartridge 101 is mounted in a disk drive (not illustrated). At this occasion, the slide shutter 110 is slid against urging force of the return spring 111 and then the opening portion 107 is opened. When the disk cartridge 101 is mounted, the disk 102 is fixed to a shaft of a spindle motor of the disk drive by a magnet or the like and driven to rotate, and then a pair of recording/reproducing heads are inserted from the opening portion 107 and arranged opposedly to both upper and lower faces of the disk 102 so that recording or reproducing is carried out.

PROBLEMS IN BACKGROUND ART

However, according to the disk cartridge 101 having the slide shutter 110 shown in FIG. 25, there is a physical restriction in a width dimension of the opening portion 107 which emerges after the slide shutter 110 has finished sliding. That is, the slide shutter 110 is constituted so as to slide and to move at the side face of the disk cartridge 101 and therefore, a lateral width of the slide shutter 110 must be constituted to be equal to or smaller than ½ of a lateral width of the disk cartridge 101 and accordingly, the width of the opening portion 107 is equal to or smaller than ½ of the lateral width of the cartridge.

In this way, according to the conventional disk cartridge 101, the width of the opening portion 107 cannot be set widely relative to the lateral width of the cartridge main body and therefore, it is not suitable for a drive apparatus having a pivoting type actuator in which a recording/reproducing head constitutes a movement locus in a fan-like shape as in a removable hard disk.

Further, in the case of the conventional disk cartridge 101, when an abnormality is caused in a shutter opening and closing mechanism at inside of the apparatus and the disk cartridge 101 is inserted into the disk drive in a state in which the slide shutter 110 stays to be closed, the slide shutter 110 collides with main parts such as a lamp and a head arranged at inside of the apparatus and depending on cases, there is a fear of destruction of these parts and out of function thereof.

Further, when in the midst of inserting or in the midst of discharging the disk cartridge 101, the shutter opening and closing mechanism on the side of the disk drive and the slide shutter 110 are inadvertently disengaged, there is a fear of a collision of the slide shutter 110 closed by the return spring 111 with a lamp or a head and an occurrence of destruction or the like.

OBJECT OF THE INVENTION

The present invention has resolved the above-described problems and proposes a disk cartridge capable of firmly providing a wide opening portion and capable of preventing a door of a disk cartridge and parts at inside of a disk drive from colliding with each other.

Further, the present invention proposes a door opening and closing mechanism of a disk cartridge capable of firmly providing a wide head insertion slot and capable of stably opening and closing a door of a disk cartridge, and a disk drive using thereof.

DISCLOSURE OF THE INVENTION

In order to resolve the above-described problems, according to an aspect of the invention, there is provided a disk cartridge comprising cartridge shells containing a disk medium and being mounted in a disk drive to record or reproduce signals, characterized in that the disk cartridge is provided with an opening portion for allowing a head for recording the signal on the disk cartridge medium or reproducing it from the disk cartridge medium to be inserted, and a rotating type door for opening or closing the opening portion, wherein the door is provided with a notch for permitting a projected streak portion for determining opening or closing of the door on a side of the disk drive to be entered therein only when the rotated door reaches a predetermined rotational angle.

In mounting the disk cartridge to the disk drive, when the door is properly rotated and the opening portion is opened, the projected streak portion on the side of the disk drive enters in the notch and the disk cartridge can be mounted. Further, a head and the like are inserted from the opening portion to inside of the cartridge so that the signal is recorded or reproduced.

In the meantime, in mounting the disk cartridge to the disk drive, when the door is not rotated and the opening portion is not opened by some cause, the door and the projected streak portion are brought into contact with each other and the disk cartridge cannot be inserted further.

Therefore, since the rotating type door is used in the present invention, in comparison with the case of using a slide shutter, the opening portion can be provided widely, which is preferable in a drive apparatus having a pivoting type actuator in which a recording/reproducing head constitutes a movement locus in a fan-like shape as in a removable hard disk.

Further, in mounting the disk cartridge, when the door is not opened by some cause, the projected portion on the side of the disk drive cannot be entered in the notch and accordingly, mounting of the disk cartridge is hampered and there is achieved an effect in which destruction of inner parts such as a head, a lamp can be prevented beforehand or the like.

Further, according to another aspect of the present invention, there is provided a door opening and closing mechanism of a disk cartridge for opening and closing a rotating type door attached to an opening portion of the disk cartridge, characterized in that an engaging pin is movably provided with a side wall opposed to a side face of the disk cartridge and that in accordance with advancing of the disk cartridge, the engaging pin is moved on a predetermined track while engaging with at least one side face of the door to rotate the door and open the opening portion.

When the disk cartridge is inserted into the apparatus, firstly, the engaging pin is engaged with the at least one side face of the door. Thereafter, the engaging pin is moved along the predetermined track so that the door is rotated until the disk cartridge reaches a predetermined mounting position and the opening portion is opened.

Therefore, according to the present invention, the door is rotated and the opening portion is opened by following the disk cartridge and therefore, in comparison with a door opening and closing mechanism of sliding a slide shutter, ahead insertion slot can be provided widely, which is preferable also in respect of a drive apparatus having a pivoting type actuator in which a recording/reproducing head constitutes a movement locus in a fan-like shape as in a removable hard disk. Further, the door is rotated by utilizing the side face thereof and accordingly, the door can be opened stably.

Further, a disk drive according to the present invention is featured in providing a projected streak portion for determining opening or closing of a door, which enters in a notch installed at the door only when the rotated door reaches a predetermined rotational angle.

In mounting the disk cartridge to an apparatus, when the door is properly rotated and the opening portion is opened, the projected streak portion of the door opening and closing mechanism enters in the notch and the disk cartridge can be mounted.

In the meantime, in mounting the disk cartridge to an apparatus, when the door is not rotated and the opening portion is not opened by some cause, the door and the projected streak portion are brought into contact with each other and the disk cartridge cannot be mounted.

Therefore, according to the present invention, when the door is not opened by some cause in mounting the disk cartridge, the projected streak portion of the door opening and closing mechanism cannot enter in the notch of the door and accordingly, mounting of the disk cartridge is hampered and there is achieved an effect in which destruction of inner parts of the apparatus can be prevented beforehand or the like.

BRIEF DESCRIPTION OF THE DRAWINGS

FIG. 6A is a view viewing FIG. 5B in an arrow mark A direction and FIG. 6B is a view viewing FIG. 5B in an arrow mark B direction;

FIGS. 7A, 7B and 7C are views showing a constitution of a lock mechanism;

BEST MODE FOR CARRYING OUT THE INVENTION

Figure 1:
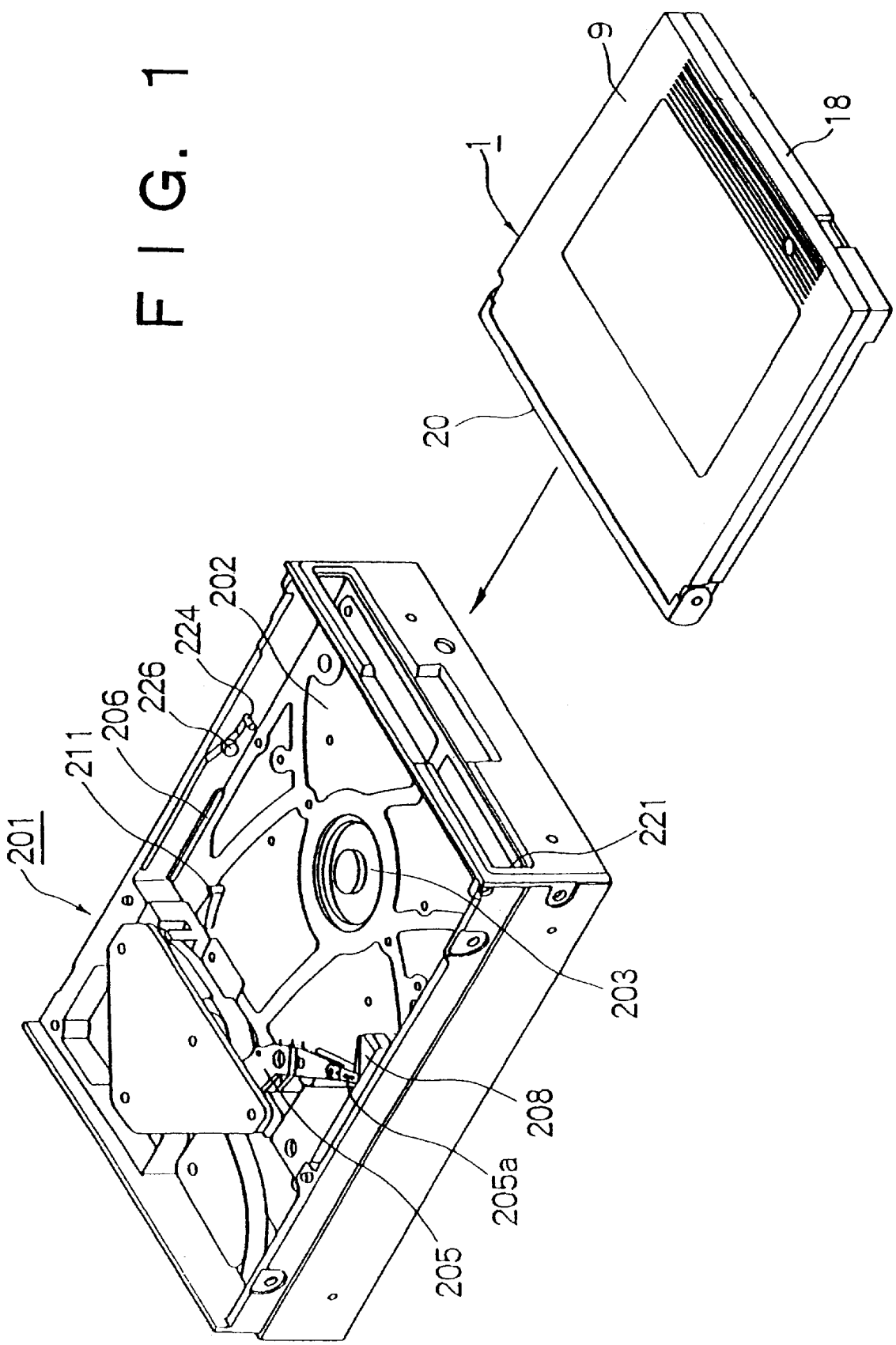
FIG. 1 is a perspective view showing an embodiment of the present invention.

A detailed explanation will be given of the best mode for carrying out the invention in reference to the drawings as follows. According to the present invention, as shown by FIG. 1, a disk cartridge 1 is inserted from a cartridge insertion slot 221 to inside of a disk drive 201 and recording or reproducing of signals is carried out by a head 205a. Further, same portions as the above are attached with the similar notations and a detailed explanation thereof will be omitted.

Figure 2:
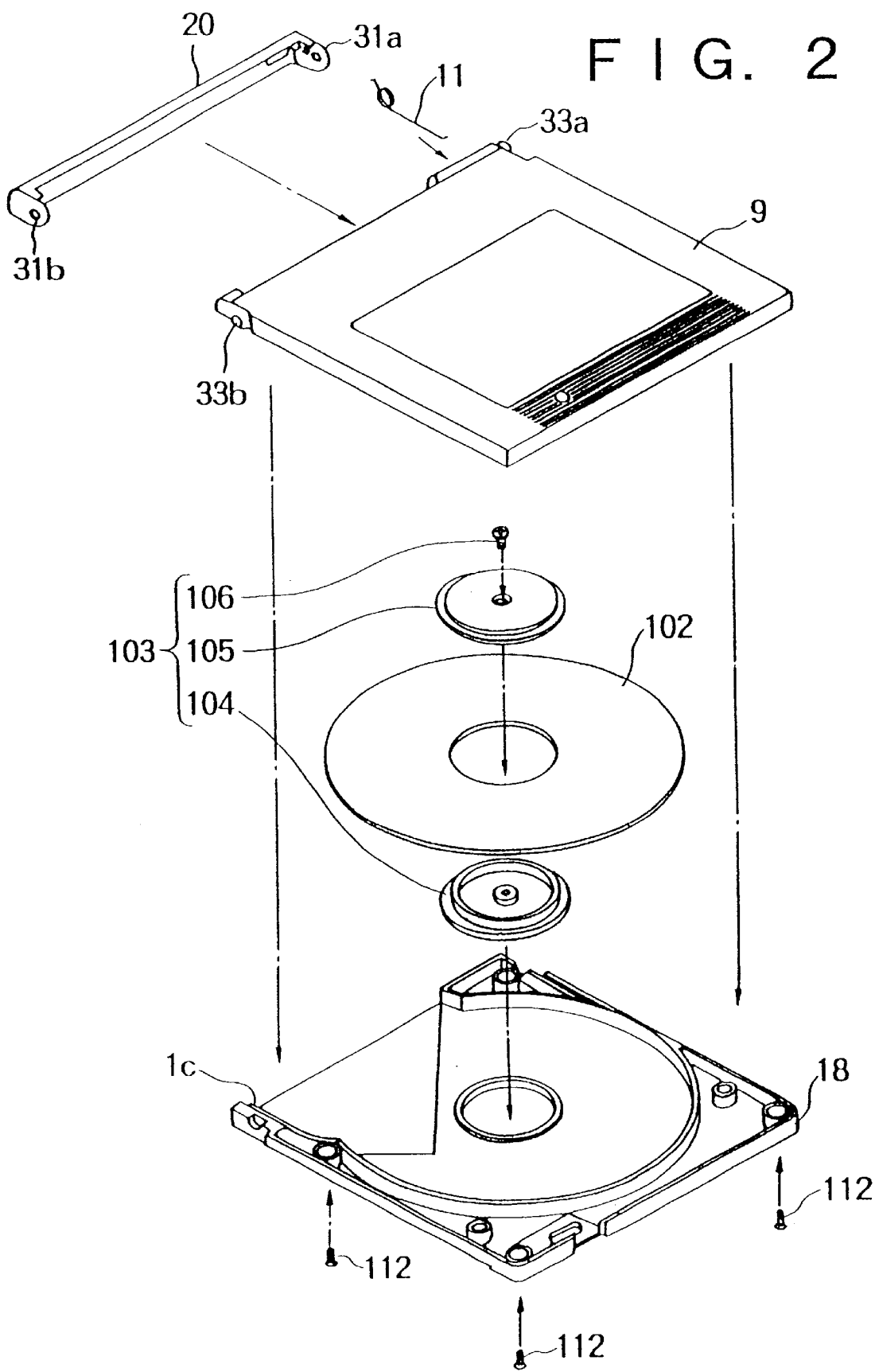
FIG. 2 is a perspective view showing constitutions of respective portions of a disk cartridge 1.

First, an explanation will be given starting from the disk cartridge 1. As shown by FIG. 2, according to the disk cartridge 1, a cartridge upper shell 9 and a cartridge lower shell 18 are fastened by the fixing screws 112 in a state in which they overlap each other. At inside thereof, the disk 102 both faces of which are pinched by the clamp member 103 is rotatably contained.

Further, the cartridge shells 9 and 18 are formed with an opening portion 1c from which the head 205a (FIG. 1) is inserted. A door 20 for closing the opening portion 1c (also shown in FIG. 3) in order to prevent dust and dirt or the like from being entrapped from the opening portion 1c is attached, and the door 20 is previously attached to the cartridge upper shell 9 along with a return spring 11.

Figure 4:
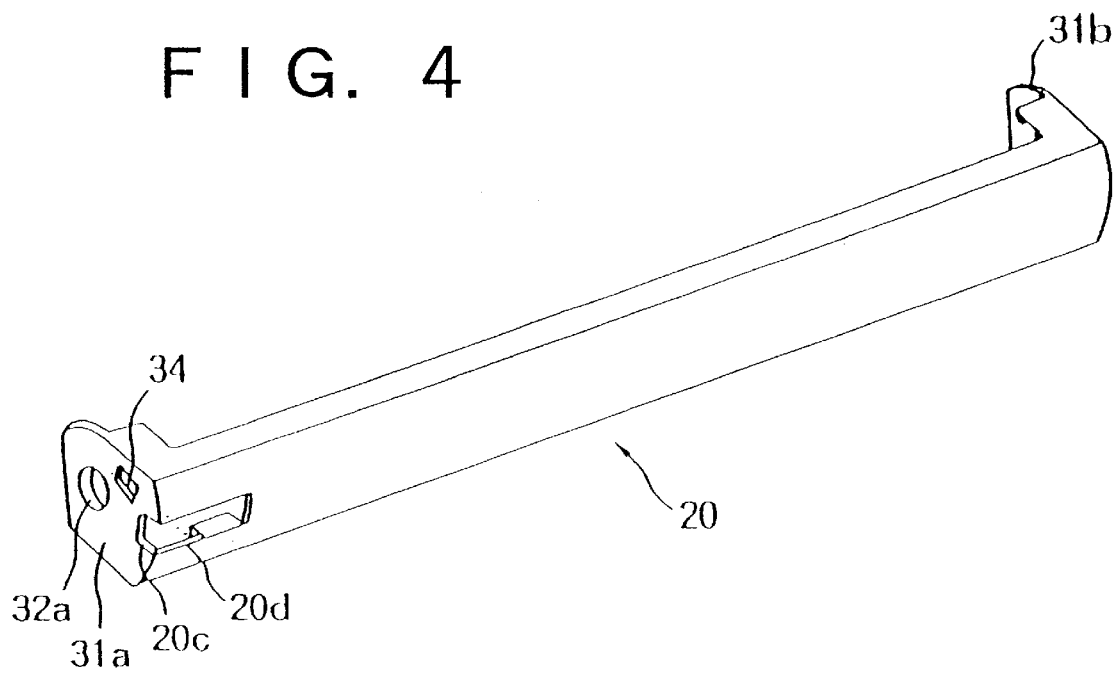
FIG. 4 is a perspective view showing shape of a door 20.

As shown by FIG. 4, a door 20 is formed in a channel-like shape by bending sheet metal and both bent edges constitute side faces 31a and 31b opposed to each other. Shaft holes 32a and 32b (also shown in FIGS. 6A and 6B) are perforated at the side faces 31a and 31b.

Figure 3:
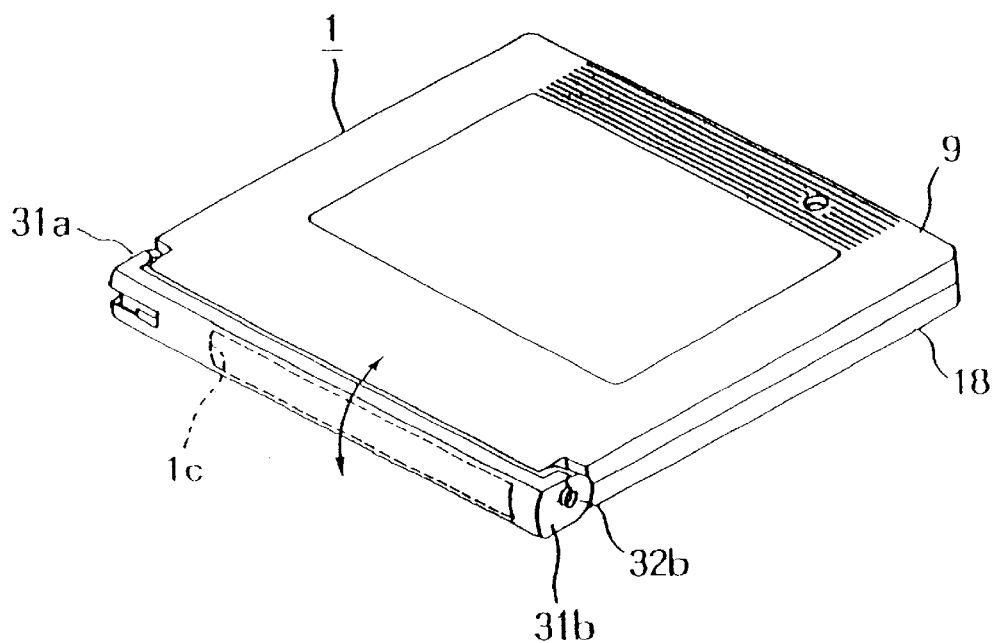
FIG. 3 is a perspective view showing outlook of the disk cartridge 1.

Rotating shafts 33a and 33b (FIG. 2) provided at side faces of a front portion of the cartridge upper shell 9 are inserted into the shaft holes 32a and 32b and as shown in FIG. 3, the door 20 is rotatably attached to a front face of the cartridge shells 9 and 18. The door 20 has a length not only closing the opening portion 1c of the disk cartridge 1 but also closing substantially a total width of the disk cartridge 1.

Figure 24A:
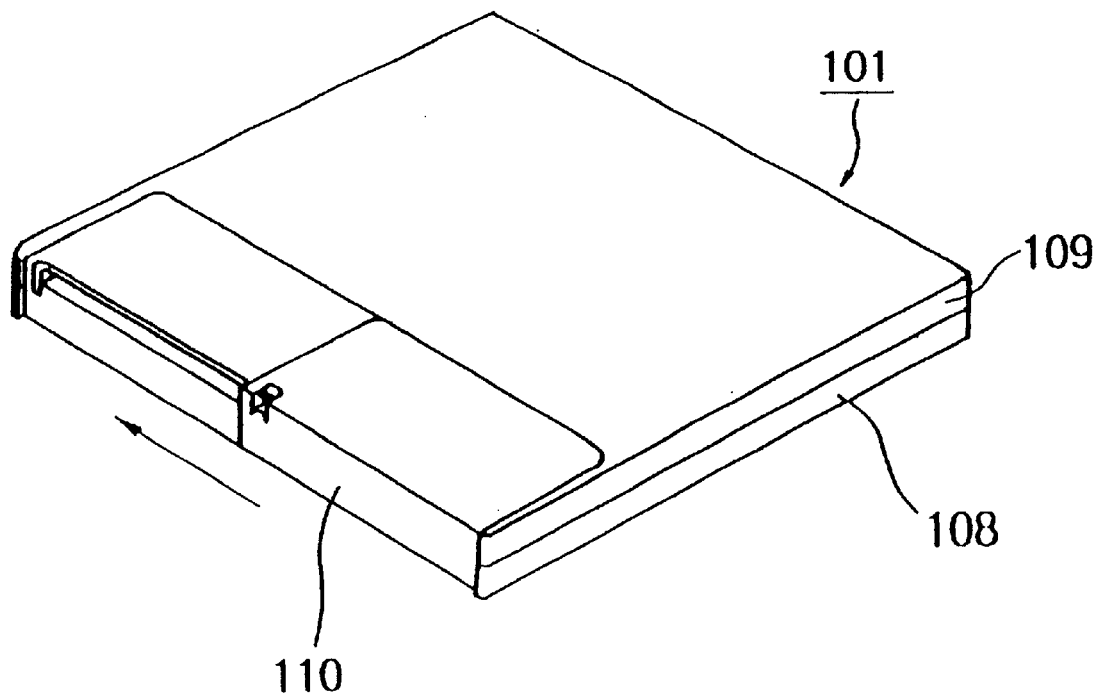
FIGS. 24A and 24B are perspective views showing outlook of a conventional disk cartridge and FIG. 25 is a perspective view showing constitutions of respective portions of the conventional disk cartridge.
Figure 24B:
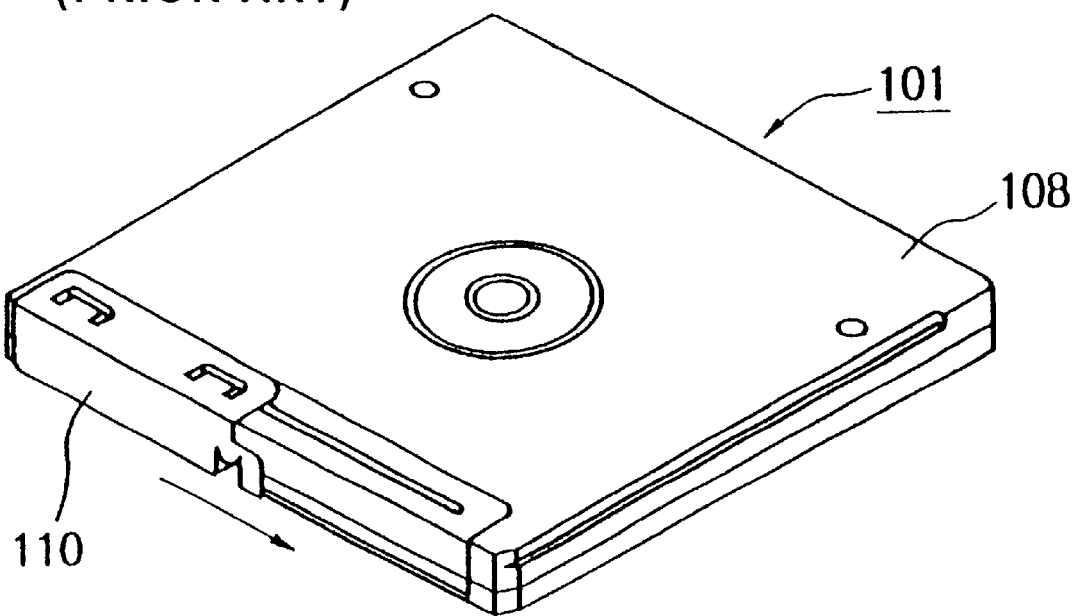
Figure 25:
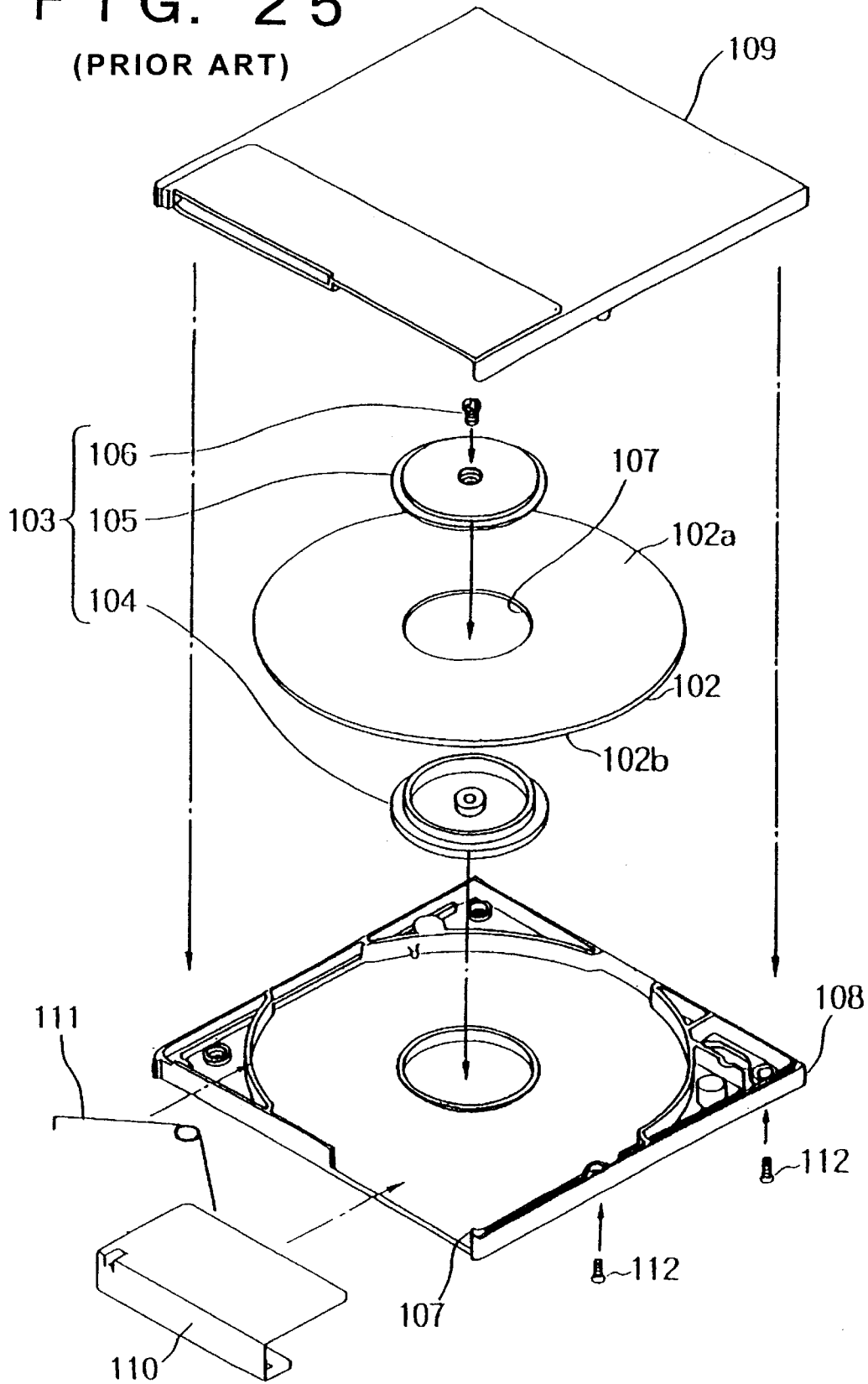

By adopting the rotating type door 20 in this way, the width of the opening portion 1c can be provided wider than that of the conventional disk cartridge 101 (FIGS. 24A and 24B) adopting the slide type shutter 110. Further, the door 20 may be molded integrally by plastic so far as it can maintain necessary strength and in this case, the fabrication cost can be reduced.

As shown in FIG. 4, there is installed a notch (engaged recess portion) 20c at the side face 31a of the door 20 and in continuation to the notch 20c, there is formed a pin insertion hole 20d provided with a constant width on a front face side of the door 20. The notch 20c is to be engaged with a door opening and closing pin (engaging pin) 224 (FIG. 11) when the door 20 is opened or closed at inside of the disk drive.

Figure 5A:
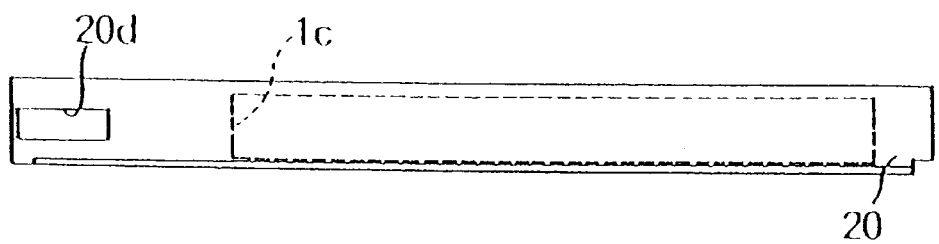
FIG. 5A is a front view of the disk cartridge 1 and FIG. 5B is a bottom view thereof.
Figure 5B:
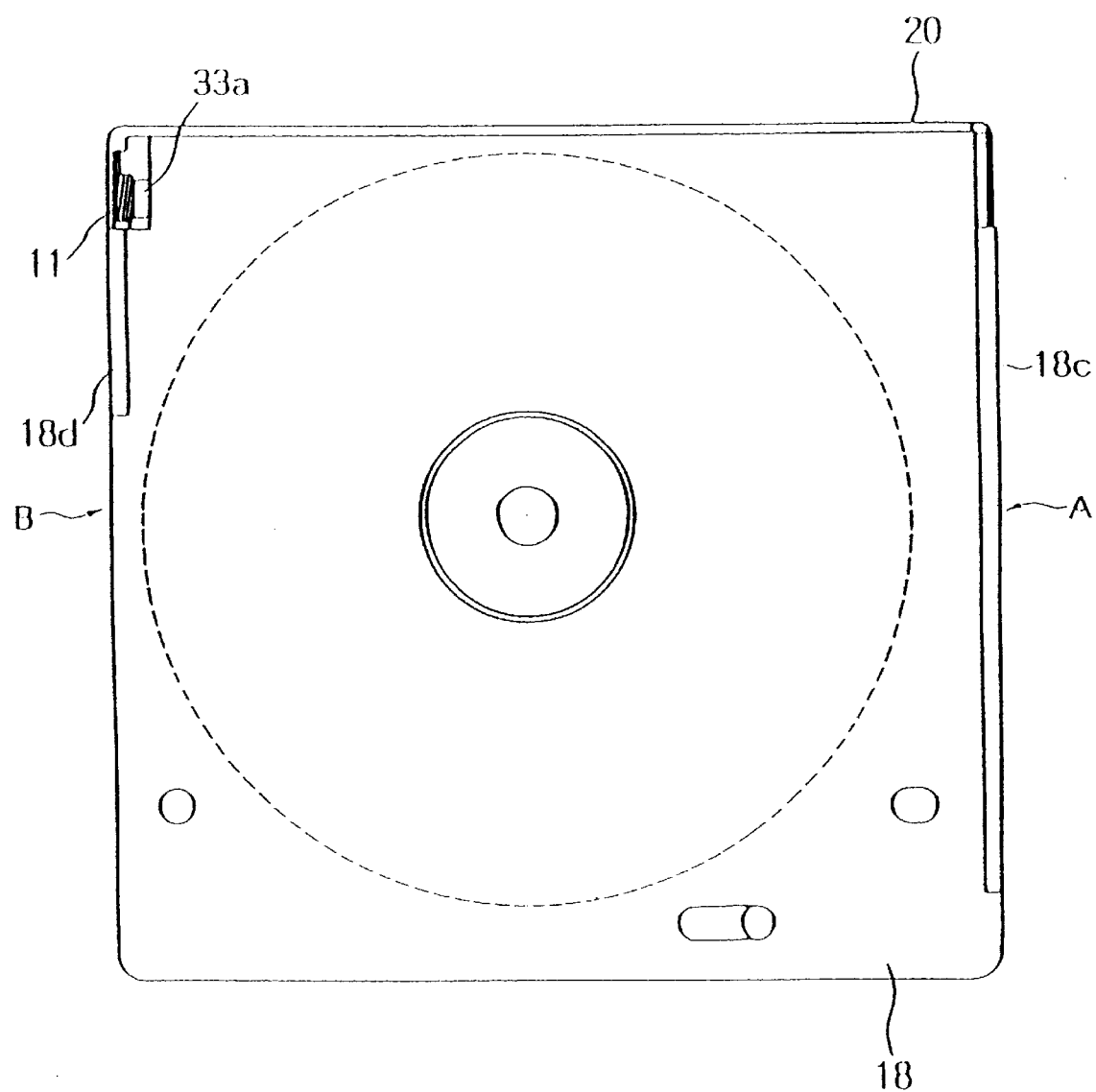

As shown in FIG. 5B, the return spring 11 is wound at the rotating shaft 33a of the door 20 on one side and is contained at inside of the disk cartridge 1. One end of the return spring 11 is engaged with a hook 34 (FIG. 4) at the side face 31a of the door 20 and other end is engaged with the cartridge upper shell 9 (FIG. 2). Accordingly, the door 20 is urged to close by the return spring 11.

As shown in FIG. 5B and FIG. 6B, there is formed a first groove 18d having a predetermined length at one side portion (left side corner in FIG. 5B) on the lower face side of the cartridge lower shell 18 from the front portion to a portion proximate to the center. A projected streak portion 206 (FIG. 11) for detecting opening of the door in the disk drive 201 enters in the first groove 18d after the door 20 has completely been opened.

Further, as shown in FIG. 6B, a notch 35 in a linear shape is formed at a portion of a side face of the door 10. The notch 35 forms a straight line along with the first groove 18d when the door 20 is rotated and permits the projected streak portion 206 (FIG. 11) to pass therethrough.

As shown in FIG. 5B and FIG. 6A, there is provided a second groove 18c longer than the first groove 18d on other side portion (right side corner in FIG. 5B) on the lower face side of the cartridge lower shell 18 from the front portion to a portion proximate to the rear portion. A projected portion 207 (FIG. 8) installed in the disk drive 201 for preventing erroneous insertion enters in the second groove 18c. That is, when the disk cartridge 1 is inserted from a rear side thereof, the projected portion 207 (FIG. 8) cannot engage with the groove 18c and accordingly, a further insertion can be prevented.

Figure 8:
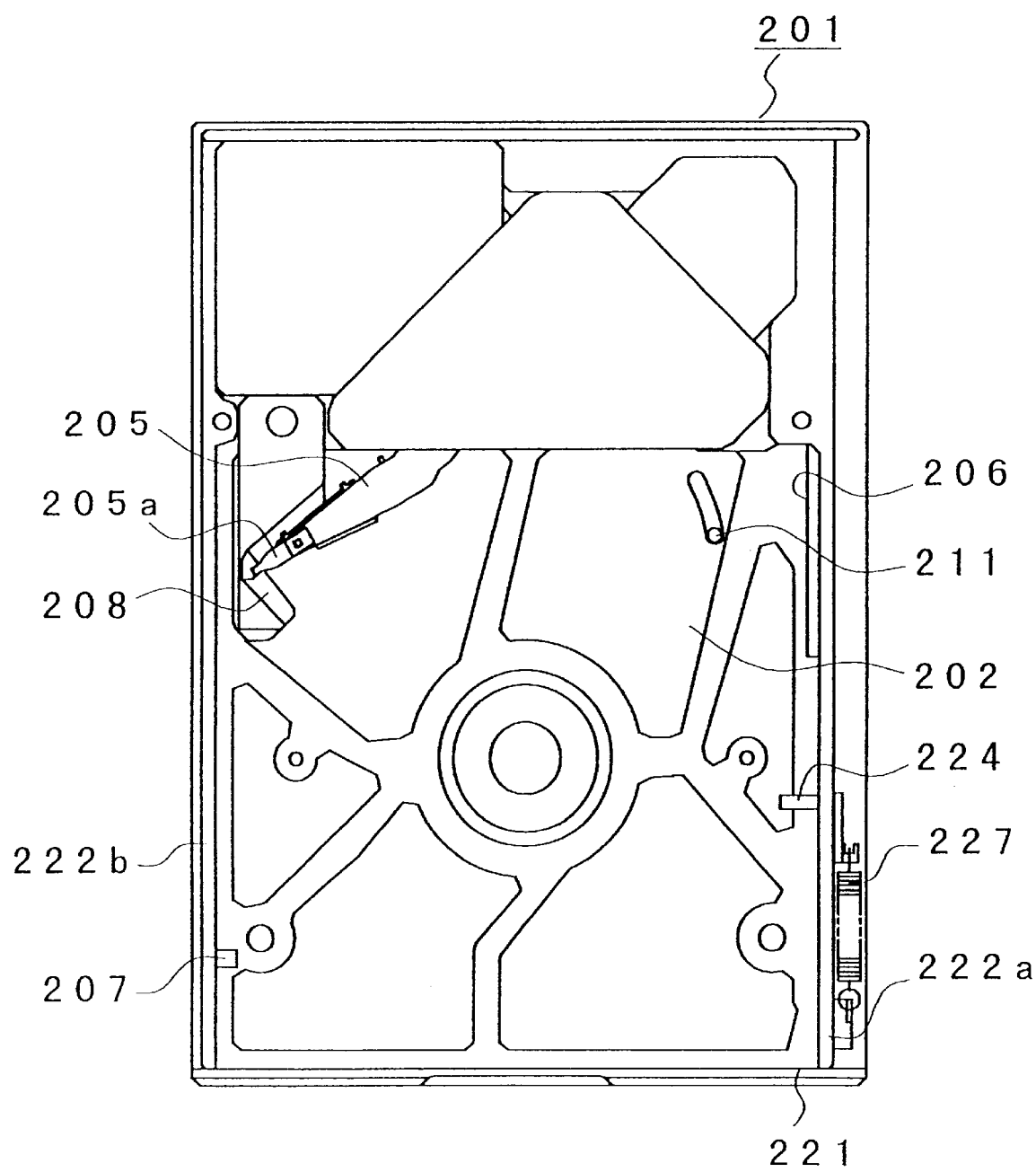
FIG. 8 is a top view of a disk drive 201.

Further, a notch 36 is formed in a linear shape on the lower portion side at the side face 31b of the door 20 shown in FIG. 6A such that the projected portion 207 (FIG. 8) can pass therethrough before the door 20 is opened. Further, the second groove 18c is set to be longer than the first groove 18d because as shown in FIG. 8, the projected portion 207 is formed at a vicinity of a cartridge insertion slot 221 such that erroneous insertion can be determined from an early stage immediately after inserting the disk cartridge 1 to thereby achieve protection of parts at inside of the disk drive 201.

The door 20 in the closed state is locked by a lock mechanism shown by FIG. 7A. The lock mechanism is constituted by a lock piece 41 extractably and retractably attached to front portions of the cartridge shells 9 and 18 and a spring (not illustrated) urging the lock piece 41 in a projected direction. In the meantime, the door 20 is formed with an engaging portion 42 engaged with the lock piece 41 and formed by folding inwardly one end of the pin insertion hole 20d. Further, a top portion of the lock piece 41 is formed with a curved face 41a for guiding relocking of the engaging portion 42 after locking is temporarily released.

For example, even when the door 20 closed as shown in FIG. 7A is intended to open, the engaging portion 42 locks the lock piece 41 and then unprepared opening is prevented. Further, although mentioned later, when the disk cartridge 1 is inserted, as shown in FIGS. 7B and C, the opening and closing pin 224 engaged with the notch 20c presses the lock piece 41 to retract whereby the door 20 can be rotated. When the door is closed, the engaging portion 42 is brought into sliding contact with the inclined face 41a and rides over the lock piece 41 and the door 20 is locked again.

Next, an explanation will be given of the disk drive 201. As shown in FIG. 1, the above-described disk cartridge 1 is inserted from the cartridge insertion slot 221 of the disk drive 201. There are attached an actuator 205 attached with the head 205a for recording/reproducing, a lamp 208 and so on at inside of the disk drive 201. When inserting the disk cartridge 1, the door 20 of the disk cartridge 1 is rotated by a door opening and closing mechanism, explained below, the head 205a and the lamp 208 are inserted from the opening portion 1c (FIG. 2) which is opened, and recording or reproducing of signals is carried out.

Figure 9:
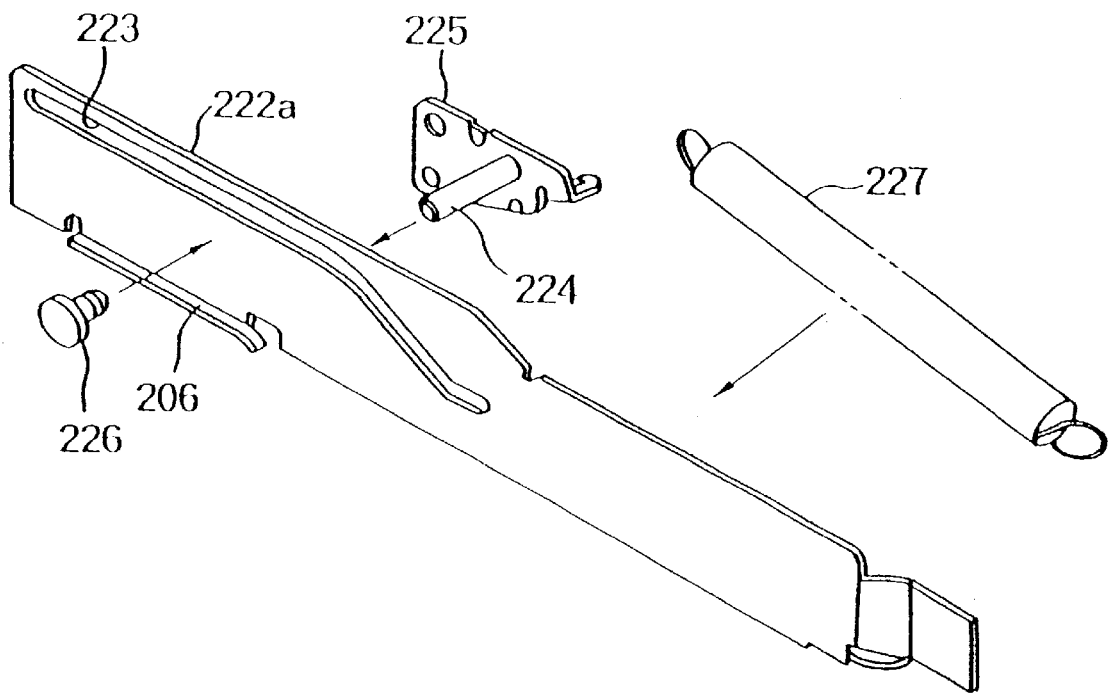
FIG. 9 is a perspective view showing constitutions of respective portions of a door opening and closing mechanism.

As shown in FIG. 9, the door opening and closing mechanism is constituted by a groove 223 installed at a side wall 222a, a moving plate 225 orthogonally fixed with the door opening and closing pin 224, a guide pin 226 for guiding movement of the moving plate 225 and a return spring 227 for urging the moving plate 225.

As shown in FIG. 9, on the side of the cartridge insertion slot 221, the groove 223 starts from the center of the side wall 222a, thereafter rises gradually toward the upper portion of the side wall 222a and is thereafter formed horizontally along the upper portion of the side wall 222a. The opening and closing pin 224 is moved along the groove 223, thereby carrying out operation of opening the door 20.

Figure 10:
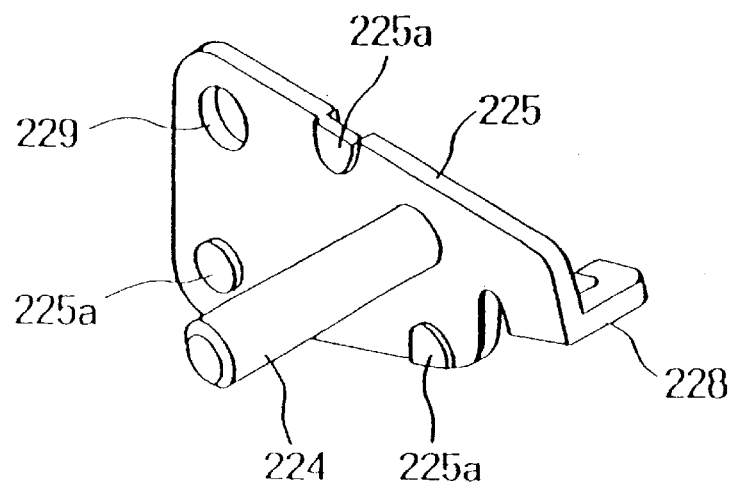
FIG. 10 is a perspective view showing shape of a moving plate 225.

Further, as shown in FIG. 10, the moving plate 225 is formed substantially in a triangular shape and the opening and closing pin 224 is fixed substantially to its center. The front end of the moving plate 225 is folded so as to form a hook 228 for engaging the spring. Further, a fixing hole 229 for fixing the guide pin 226 (FIG. 9) is installed at an upper portion on the rear side of the moving plate 225. Further, there are projected at the moving plate 225, projected portions 225a at three locations which are brought into contact with an outer face of the side wall 222a (FIG. 9), thereby making smooth the movement of the moving plate 225.

Figure 11:
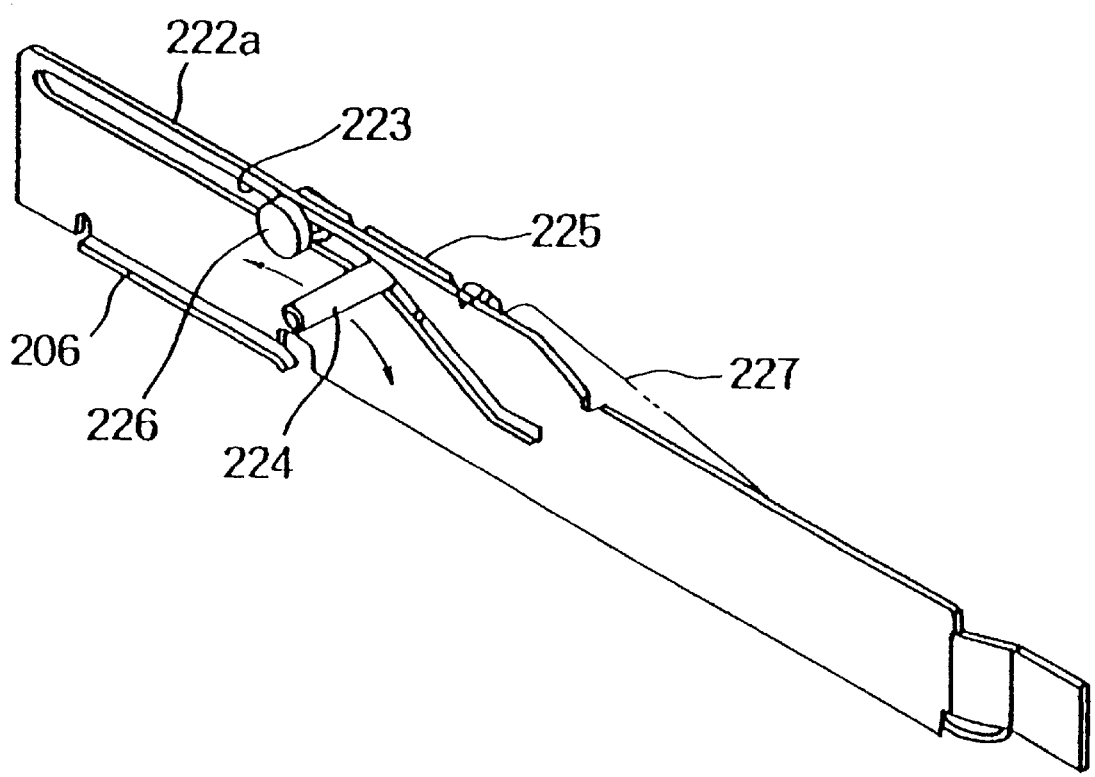
FIG. 11 is a perspective view of the door opening and closing mechanism.
Figure 12:
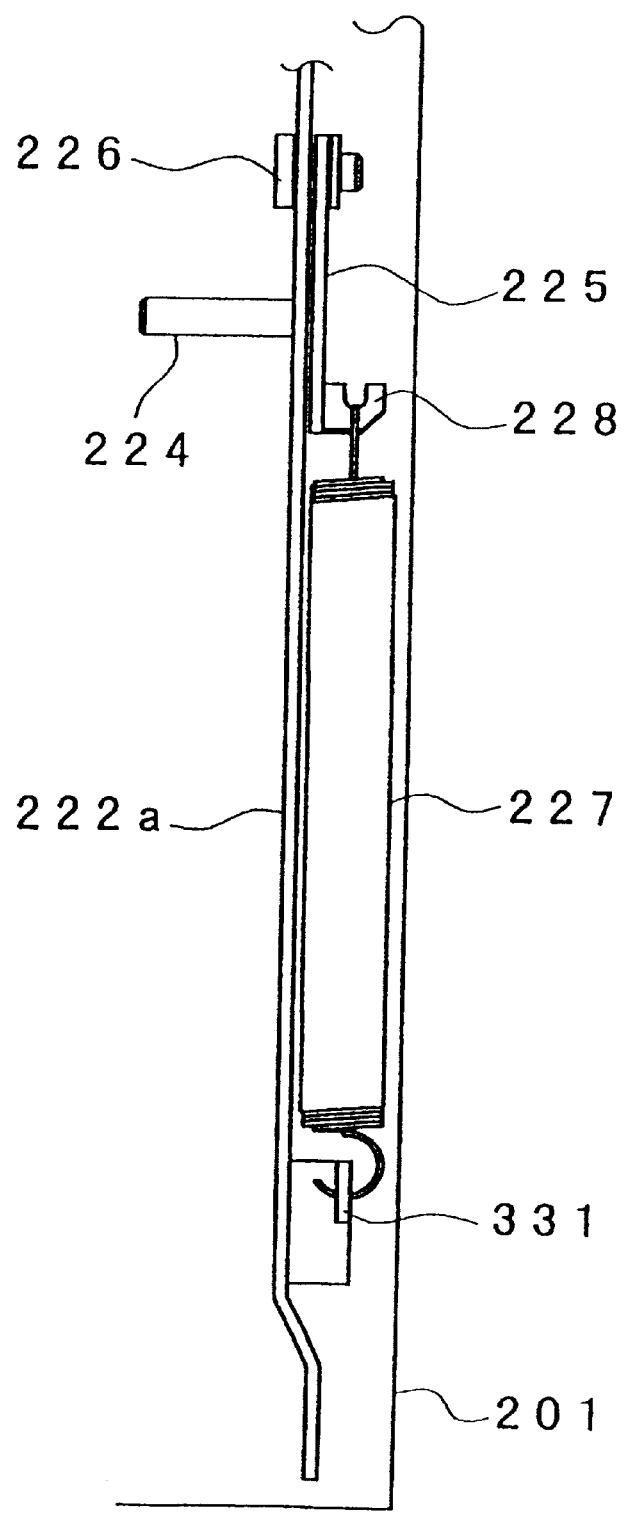
FIG. 12 is a top view of the door opening and closing mechanism.
Figure 13:
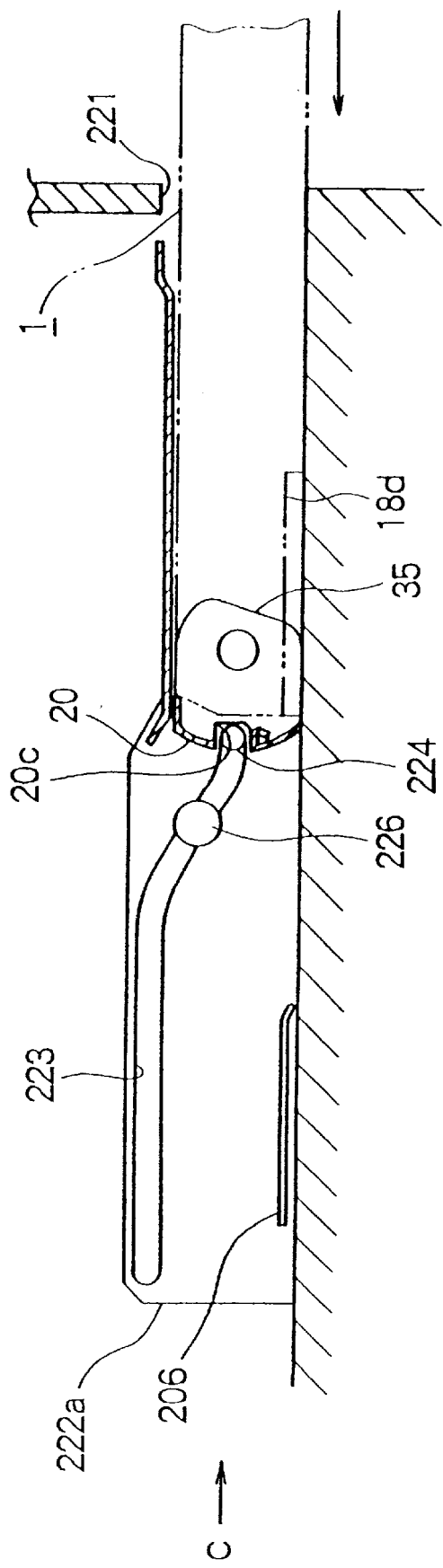
FIG. 13 is a sectional view showing an operation (1/3) of opening the door.

As shown in FIG. 11, in a state in which the opening and closing pin 224 and the guide pin 226 are inserted through the groove 223, the moving plate 225 is set on the outer side of the side wall 222a and the opening and closing pin 224 is horizontally projected to the inner side. Further, as shown in FIG. 12, one end of the return spring 227 is engaged with the hook 228 of the moving plate 225 and other end thereof is engaged with a hook 331 formed at the side wall 222a. Further, as shown in FIG. 13, the opening and closing pin 224 is disposed at a front end (standby position) of the groove 223 by the urging of the return spring 227.

Further, there is formed the projected streak portion 206 for detecting the opening or closing state of the door 20 (FIG. 3) of the disk cartridge 1 at a lower portion of the rear portion of the side wall 222a. The projected streak portion 206 can pass through the notch 35 only when the door 20 of the inserted disk cartridge 1 is opened.

Figure 22A:
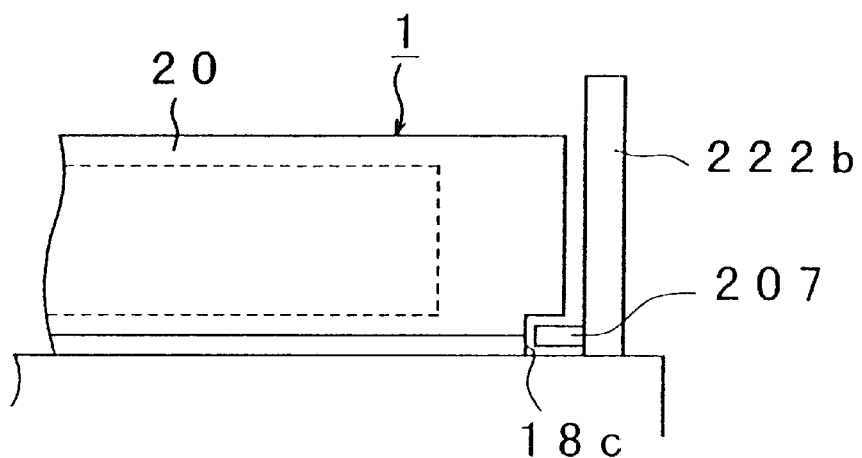
FIGS. 22A and 22B are views showing a relationship between a projected portion 207 and a groove portion 18c.
Figure 22B:
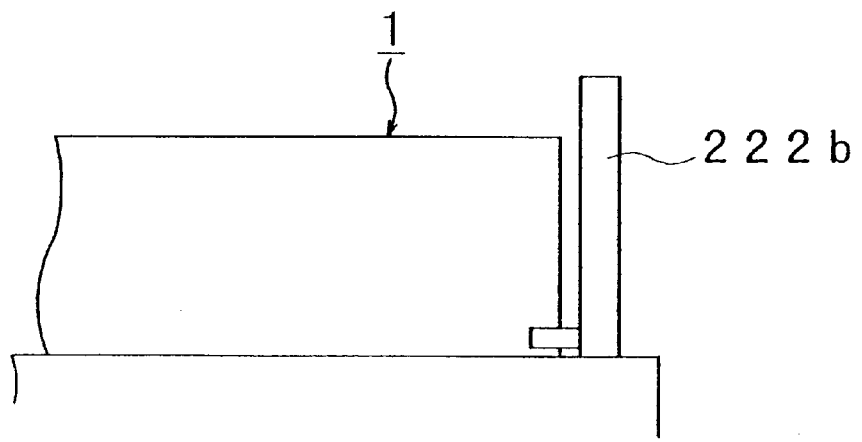
Figure 23:
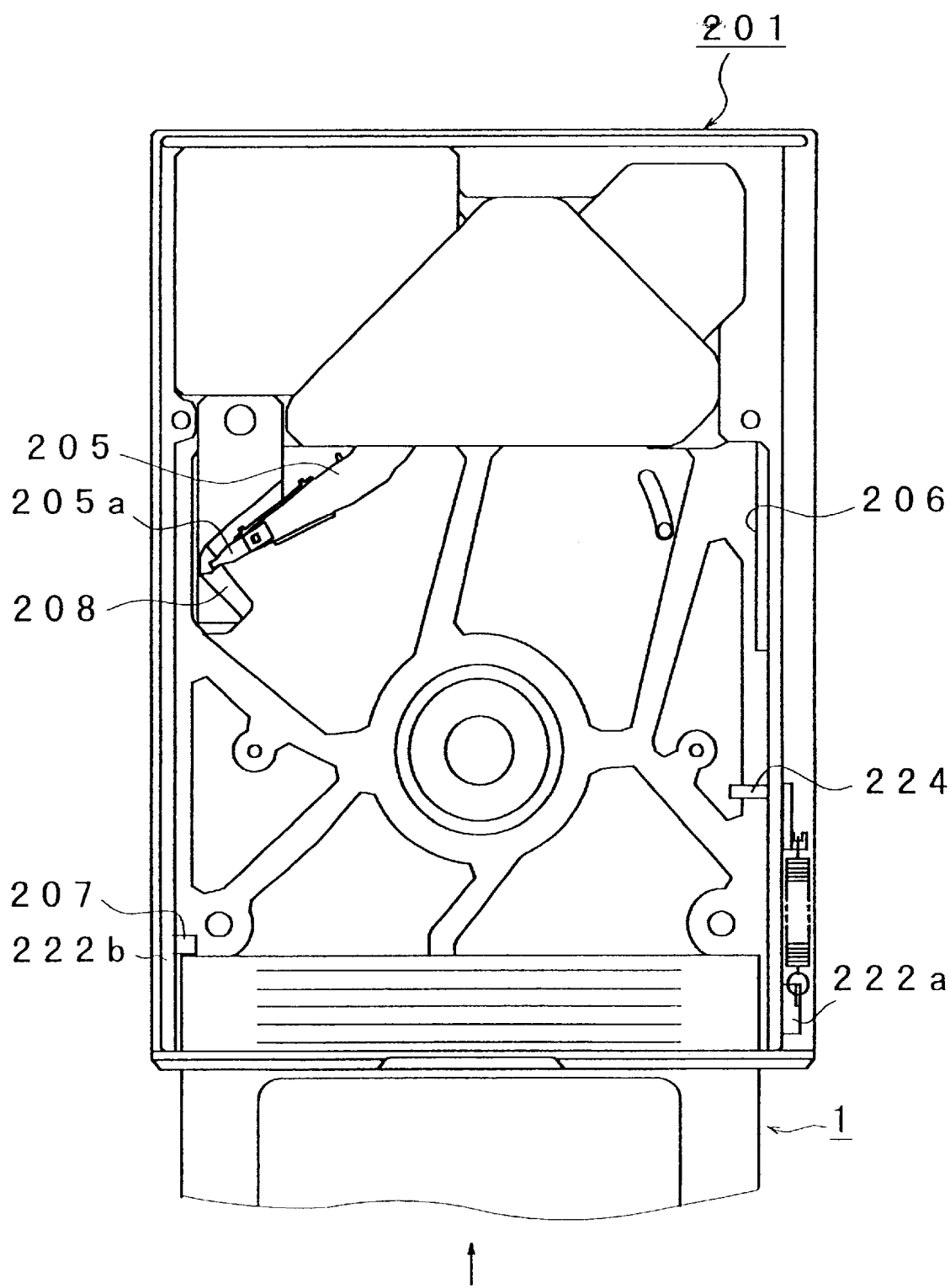
FIG. 23 is a top view when the disk cartridge is inserted from a rear portion thereof.

Further, in FIG. 8, there is projected the projected portion 207 for engaging with the second groove 18c (FIG. 5B) of the disk cartridge 1 at a vicinity of the cartridge insertion slot 221 of other side wall 222b. That is, as shown in FIG. 22A, when the disk cartridge 1 is inserted properly from the front side, the projected portion 207 enters in the second groove 18c and the disk cartridge 1 can be inserted. In the meantime, as shown in FIG. 22B and FIG. 23, when the disk cartridge 1 is inserted erroneously from the rear side, the projected portion 207 cannot engage with the second groove 18c (FIG. 22A) and a further insertion is prevented.

An explanation of the operation when the disk cartridge 1 constituted as described above is mounted to the disk drive 201, is as follows.

Figure 16:
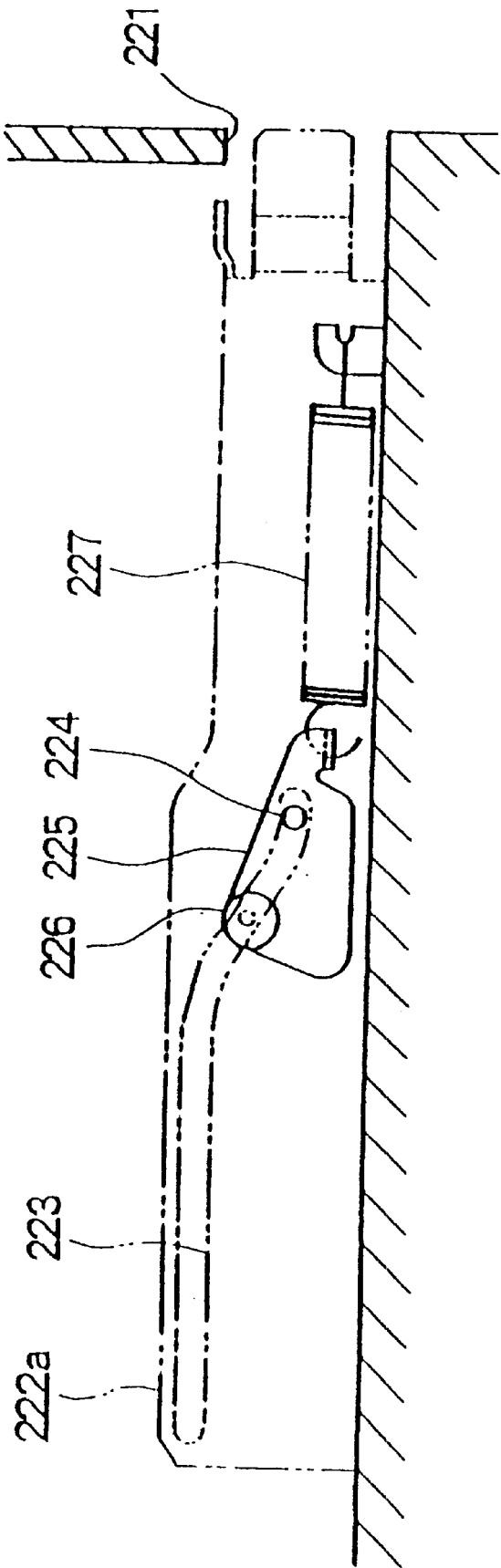
FIG. 16 is a sectional view showing an operation (1/3) of the moving plate 225.
Figure 21A:
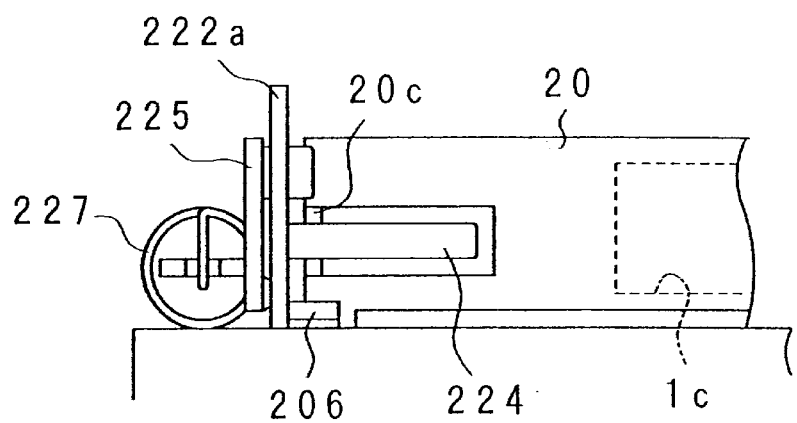
FIG. 21A is a view viewing FIG. 13 in an arrow mark C direction.

As shown in FIG. 13, FIG. 16 and FIG. 21A, the opening and closing pin 224 is disposed at the front end of the groove 223 by the return spring 227. Further, when the disk cartridge 1 is inserted, the notch 20c of the door 20 is engaged with the opening and closing pin 224. At this occasion, as shown in FIG. 7B, the lock piece 41 of the door 20 is pressed by the opening and closing pin 224, thereby releasing the locking.

In this case, by setting the urging force of the return spring 227 (FIG. 16) larger than the returning force of the lock piece 41, the state of releasing the door 20 from locking can be maintained during a time period in which the door 20 is rotated as shown in FIG. 7C after the opening and closing pin 224 has been brought into contact therewith.

Figure 14:
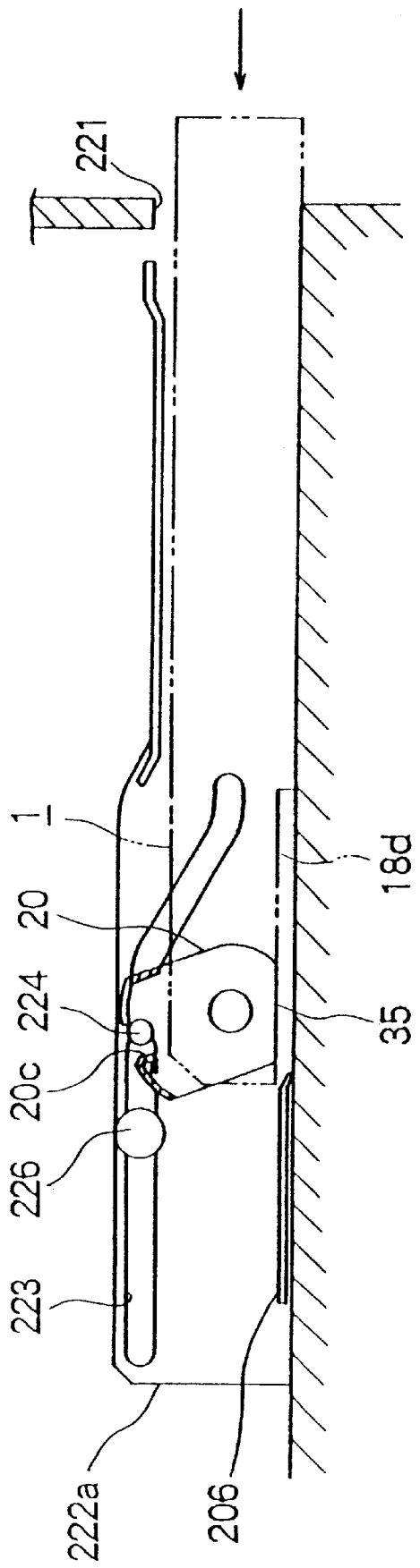
FIG. 14 is a sectional view showing an operation (2/3) of opening the door.
Figure 17:
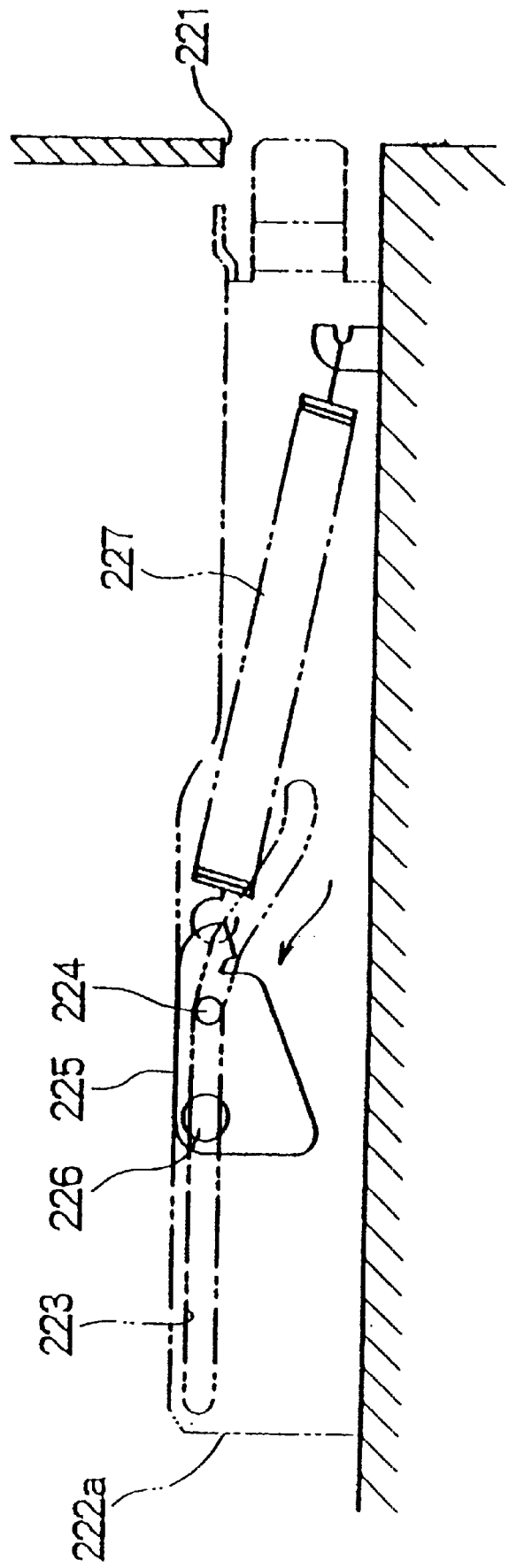
FIG. 17 is a sectional view showing an operation (2/3) of the moving plate 225.

Successively, as shown in FIG. 14 and FIG. 17, when the disk cartridge 1 is further inserted, the opening and closing pin 224 is moved by being pressed by the door 20. At this occasion, the opening and closing pin 224 is guided by the groove 223 and accordingly, the opening and closing pin 224 is moved to a side of the upper portion of the side wall 222a. Accordingly, the door 20 engaged with the opening and closing pin 224 is rotated in the clockwise direction and the opening portion 1c (FIG. 3) is opened. Further, after rotating the door 20, the notch 35 in the linear shape is directed substantially horizontally and there is brought about a state in which the projected streak portion 206 can pass therethrough.

Figure 15:
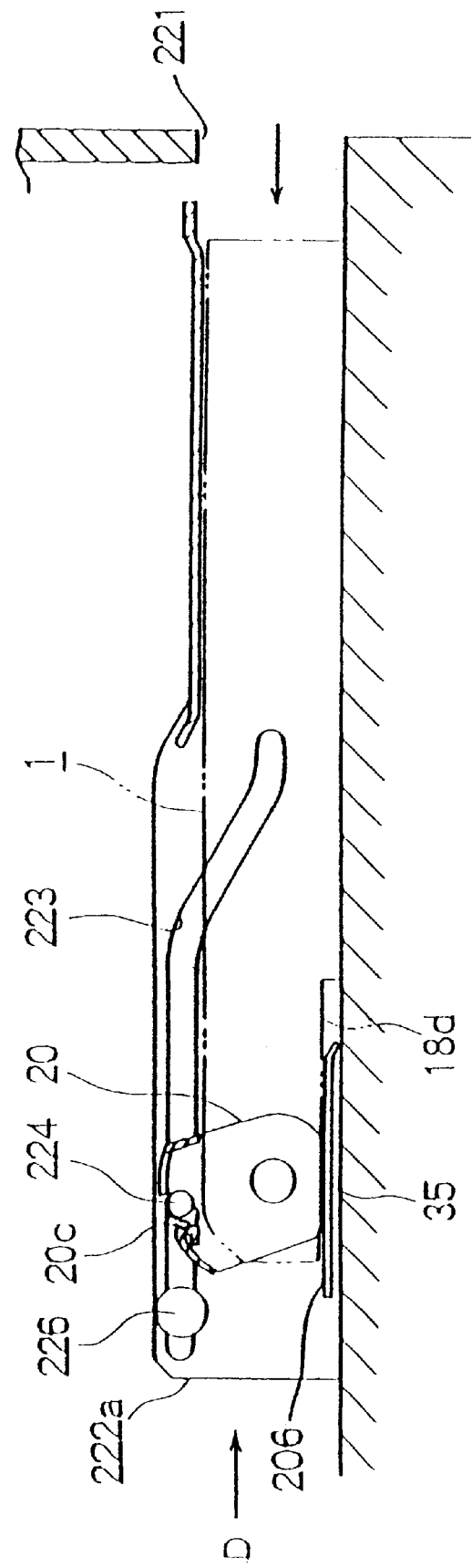
FIG. 15 is a sectional view showing an operation (3/3) of opening the door.
Figure 18:
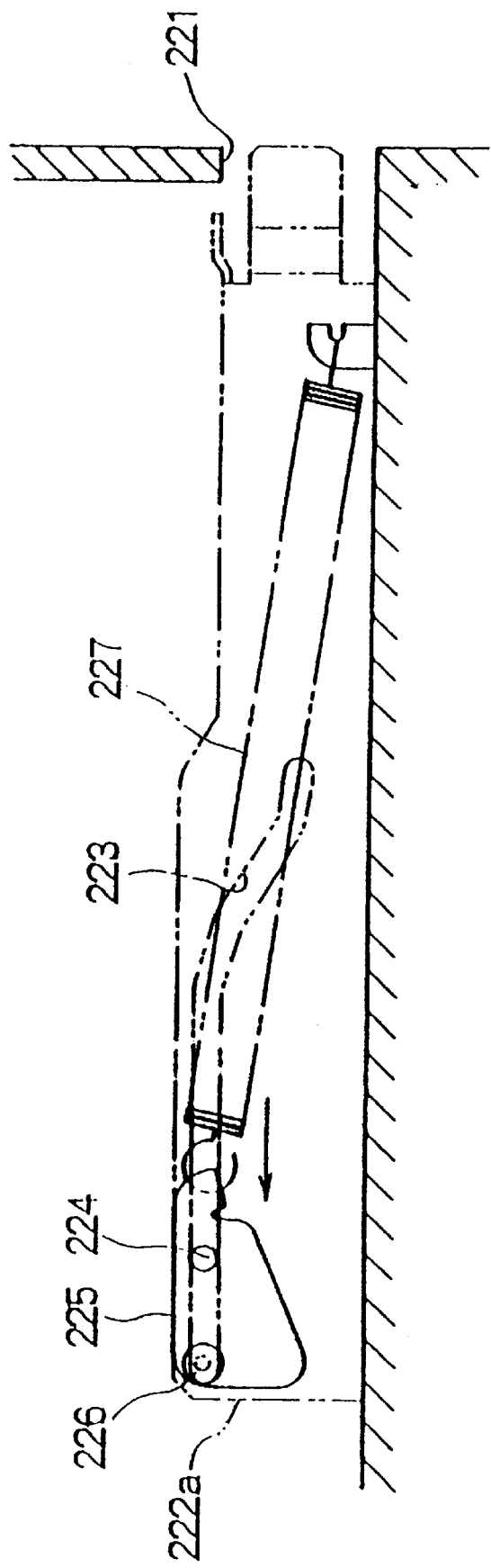
FIG. 18 is a sectional view showing an operation (3/3) of the moving plate 225.
Figure 21B:
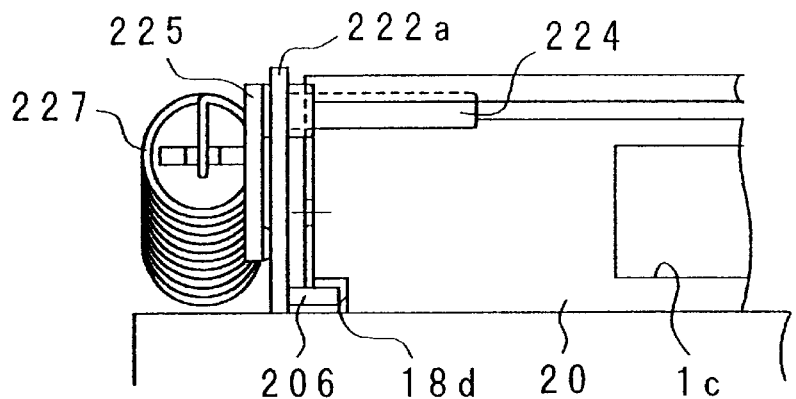
FIG. 21B is a view viewing FIG. 15 in an arrow mark D direction and FIG. 21C is a view viewing FIG. 19 in an arrow mark E direction.

As shown in FIG. 15, FIG. 18 and FIG. 21B, until the disk cartridge 1 advances further and reaches the mounting position, the projected streak portion 206 passes along the notch 35 of the door 20 and enters to the first groove 18d. Only when the door 20 is completely opened, the projected streak portion 206 can pass through the notch 35 of the door 20 and the disk cartridge 1 can be made to advance to the further front mounting position with no resistance.

When the disk cartridge 1 is arranged at the mounting position, the notch 35 is brought into contact with the upper face of the projected streak portion 206 while being directed horizontally. Further, the disk cartridge 1 is inserted in the regular direction and accordingly, the projected portion 207 shown in FIG. 8 engages with the groove 18c of the disk cartridge 1 shown in FIG. 6A.

The moving plate 225 shown in FIG. 10 is provided with the projected portions 225a at three locations and these are brought into sliding contact with the outer face of the side wall 222a (FIG. 9) and accordingly, movement of the moving plate 225 is carried out smoothly and further, the opening and closing operation by the opening and closing pin 224 is firmly carried out since the positional accuracy of the opening and closing pin 224 is promoted. Further, by disposing the position of fixing the opening and closing pin 224 at an intermediary between the hook 228 and the guide pin 229 of the moving plate 225, stability of the operation is ensured and interference of the door 20 (FIG. 13) of the inserted disk cartridge 1 with the guide pin 226 is also prevented.

When the disk cartridge 1 is mounted, the actuator 205 constituted by a pair of head gimbal assemblies (HGA) and the lamp 208 shown in FIG. 1 are inserted into the inside of the cartridge from the opening portion 1c. Further, a pin 211 projected from a chassis 202 is pressed by the cartridge lower shell 18 whereby a spindle motor 203 is mechanically moved upwardly and is magnetically chucked to the center hole of the disk 102 (FIG. 2).

Further, while driving to rotate the disk 102 by the spindle motor 203, the actuator 205 is pivoted by a voice coil motor (not illustrated), thereby carrying out recording or reproducing by the head 205a.

Figure 19:
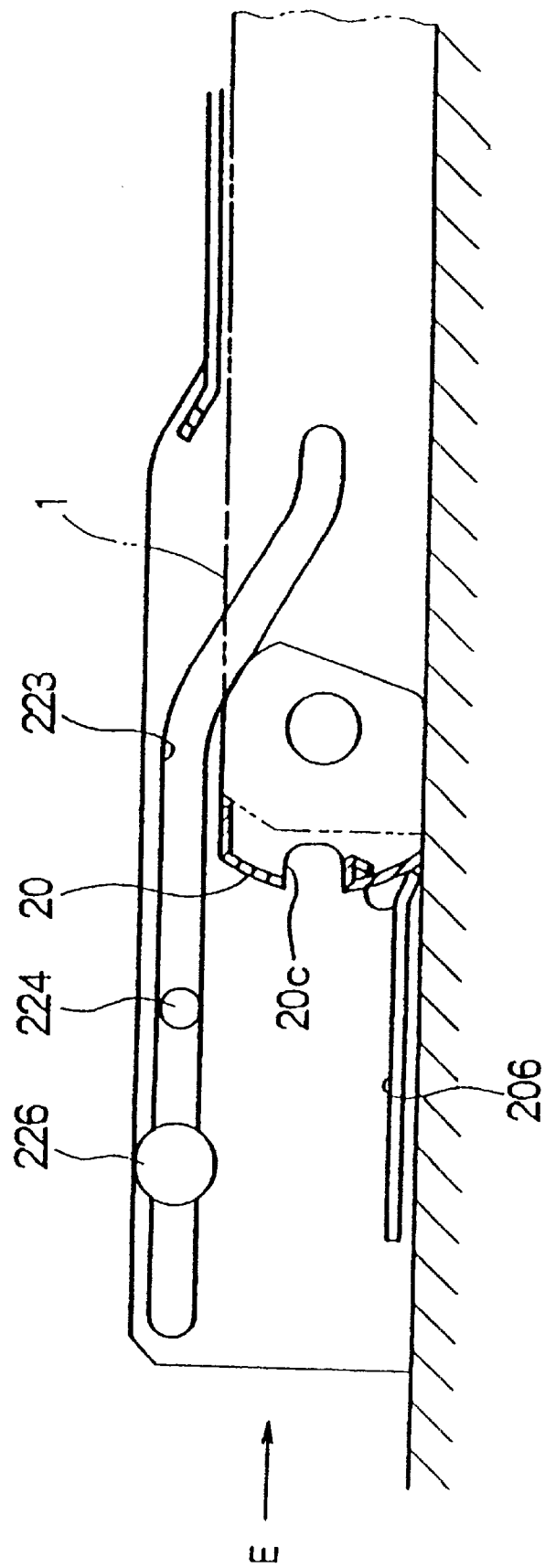
FIG. 19 is a sectional view showing a state in which an opening and closing pin 224 is stopped at a midway.
Figure 21C:
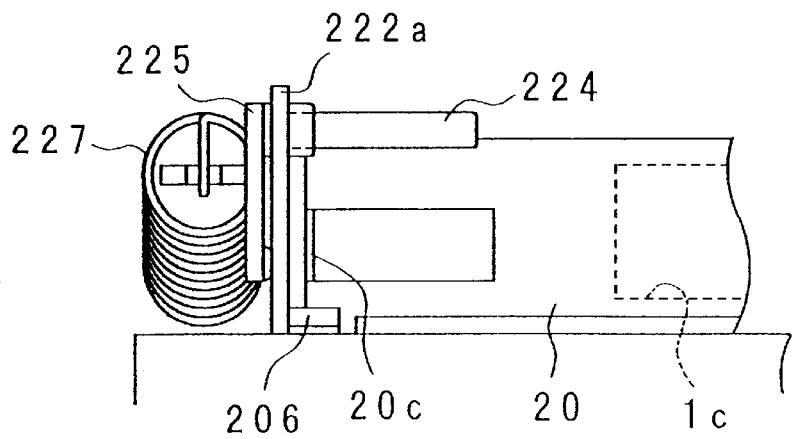

Next, an explanation will be given of a case in which there causes abnormality in opening of the door 20. FIG. 19 and FIG. 21C show a state in which the disk cartridge 1 is inserted when the opening and closing pin 224 cannot return to the normal standby position by some cause and is stopped at the upper stage of the groove 223.

As shown in FIG. 19 and FIG. 21C, the opening and closing pin 224 and the door 20 do not engage with each other and accordingly, the door 20 stays to be closed. In this case, the front face of the door 20 and the projected streak portion 206 are brought into contact with each other and the disk cartridge 1 cannot be inserted further. Accordingly, there is avoided beforehand an accident in which the disk cartridge 1 is inserted in the state where the door 20 is not opened and collides with the head 205a, the lamp 208 (FIG. 1) or the like to cause destruction.

Figure 20:
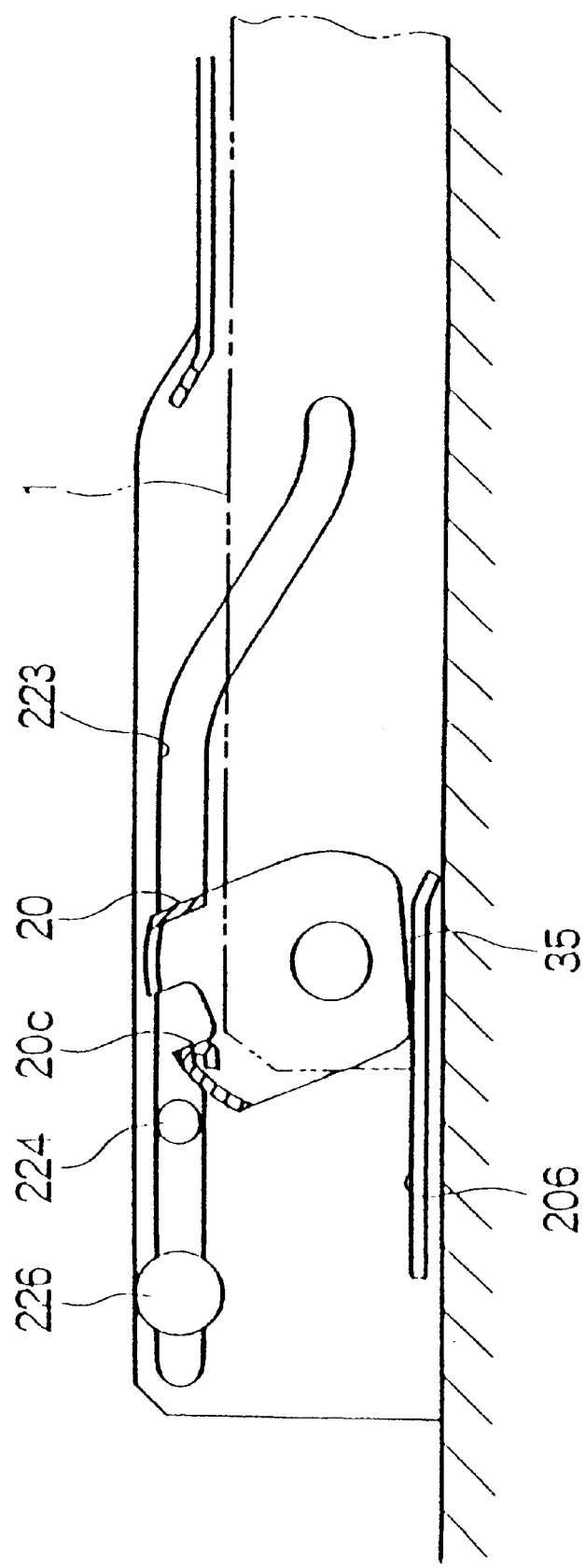
FIG. 20 is a sectional view showing a state in which the opening and closing pin 224 is disengaged.

Next, FIG. 20 shows a state in which the opening and closing pin 224 is detached from the door 20 when the disk cartridge 1 is to be discharged. During a time period in which the disk cartridge 1 is being retracted, the head 205 and the lamp 208 (FIG. 1) escape from the opening portion 1c (FIG. 3), but when the door 20 is accidentally closed during the time period, the door 20 and these parts collide with each other. However, according to the invention, the projected streak portion 206 and the notch 35 of the door 20 are brought into contact with each other and accordingly, the door 20 is maintained in the opened state regardless of detachment of the opening and closing pin 224.

By continuously forming the projected streak portion 206 in this way, the disk cartridge 1 can be retracted while maintaining the door 20 in the opened state. Further, at a position where the door 20 is permitted to close, that is, when the head 205a, the lamp 208 (FIG. 1) and the like are completely drawn out of the opening portion 1c (FIG. 3), the terminal end of the projected streak portion 206 is reached, there is no restriction in respect of the door 20 and the door 20 is closed. Accordingly, there is prevented beforehand the accident in which the door 20 is closed and collides with these parts.

As described above, there are provided two characteristic functions by the combination of the notch 35 of the door 20 and the projected streak portion 206. Firstly, as shown in FIG. 19, when inserting the disk cartridge 1, by passing the projected streak portion 206 through the notch 35 after opening the door 20, whether the door 20 is opened is detected and when the door 20 is not opened, the door 20 and the projected streak portion 206 collide with each other and further insertion is hampered.

Secondly, as shown in FIG. 20, when discharging the disk cartridge 1, even in the case where the door 20 and the opening and closing pin 224 is disengaged, the projected streak portion 206 and the notch 35 are brought into contact with each other, thereby preventing the door 20 from closing, and therefor, the escaping head 205a (FIG. 1) can be protected.

Further, only the side face of the door 20 and the shape of the cartridge lower shell 18 may be molded in the predetermined shapes and a reduction in the cost can be achieved with no need of adding new parts. Further, although the present invention has shown an example in which the invention is applied to a removable hard disk, the invention may be applied to an apparatus for recording or reproducing signals to or from other disk.

INDUSTRIAL APPLICABILITY

The present invention is preferably applied to a disk cartridge used in an information capacity recording apparatus having a large capacity and a disk drive thereof. As a disk, there is a magneto-optical disk or the like.

What is claimed is:

1. A door opening and closing mechanism adapted for a disk cartridge for opening and closing a rotating door attached to an opening portion of the disk cartridge, said door opening and closing mechanism comprising:

an engaging pin adapted for engaging with at least one side face of said rotating door to rotate said rotating door and open said opening portion with said engaging pin moving on a predetermined track in accordance with advancing of said disk cartridge, said engaging pin being movably provided for a side wall opposed to a side face of the disk cartridge;

urging means for urging said engaging pin, said urging means allowing said rotating door to be opened by moving said engaging pin against its urging force and allowing said rotating door to be closed by returning said engaging pin to a predetermined position; and a projected streak portion adapted for determining opening or closing of said rotating door, said projected streak portion entering in a notch installed in said rotating door only when the rotating door rotates to reach a predetermined rotational angle, wherein said projected streak portion is formed continuously over a predetermined length, and wherein while said inserted disk cartridge advances and reaches a second predetermined position after opening the rotating door, the closing of the rotating door is hampered by bringing said projected streak portion entered in said notch into contact with said notch of said rotating door.

2. The door opening and closing mechanism according to claim 1, wherein said engaging pin presses said disk cartridge by a returning force of said urging means and said disk cartridge is discharged.

3. The door opening and closing mechanism according to claim 1, wherein when said engaging pin engages with said rotating door, said engaging pin presses a lock piece locking said rotating door and said rotating door is opened while said rotating door is being brought into a locked state.

4. The door opening and closing mechanism according to claim 3 wherein said lock piece is urged in a direction of locking said rotating door; and wherein said urging force of said urging means is set to be larger than an urging force exerted on said lock piece, and while said engaging pin is pressing said lock piece, a lock release state of said rotating door is maintained.

5. The door opening and closing mechanism according to claim 1, wherein:

said engaging pin is attached to a movable moving plate; and said moving plate is moved while being brought into contact with said side wall to maintain said engaging pin always orthogonal relative to said side wall.

6. The door opening and closing mechanism according to claim 5, wherein:

said moving plate includes a guide pin inserted into a groove installed in said side wall to guide movement of said moving plate, and an engaged portion with which said urging means engages, said engaged portion being installed at a side of inserting said disk cartridge; and wherein said engaging pin is arranged between said guide pin and said engaged portion.

7. The door opening and closing mechanism according to claim 5, wherein:

said moving plate is provided with a plurality of projected portions; and wherein said moving plate is moved with said projected portions being brought into contact with said side wall.

8. A disk drive adapted for mounting a disk cartridge having an opening portion opened and closed by a rotating door therein to record or reproduce signals, comprising:

an engaging pin adapted for engaging with at least one side face of said rotating door to rotate said rotating door and open said opening portion with said engaging pin moving on a predetermined track in accordance with advancing of said disk cartridge, said engaging pin being movably provided for a side wall opposed to a side face of said disk cartridge;

urging means for urging said engaging pin, said urging means allowing said rotating door to be opened by moving said engaging pin against its urging force and allowing said rotating door to be closed by returning said engaging pin to a predetermined position; and a projected streak portion adapted for determining opening or closing of said rotating door, said projected streak portion entering in a notch installed in said rotating door only when the rotating door rotates to reach a predetermined rotational angle, wherein said projected streak portion is formed continuously over a predetermined length, and wherein while said inserted disk cartridge advances and reaches a predetermined position after opening the rotating door, the closing of the rotating door is hampered by bringing said projected streak portion entered in said notch into contact with said notch of said rotating door.

9. A door opening and closing mechanism adapted for a disk cartridge for opening and closing a rotating door attached to an opening portion of the disk cartridge, said door opening and closing mechanism comprising:

an engaging pin adapted for engaging with at least one side face of said rotating door to rotate said rotating door and open said opening portion with said engaging pin moving on a predetermined track in accordance with advancing of said disk cartridge, said engaging pin being movably provided for a side wall opposed to a side face of the disk cartridge;

urging means for urging said engaging pin, said urging means allowing said rotating door to be opened by moving said engaging pin against its urging force and allowing said rotating door to be closed by returning of said engaging pin to a predetermined position; and wherein said engaging pin is attached to a movable moving plate; and said moving plate is moved while being brought into contact with said side wall to maintain said engaging pin always orthogonal relative to said side wall.

10. A door opening and closing mechanism adapted for a disk cartridge for opening and closing a rotating door attached to an opening portion of the disk cartridge, said door opening and closing mechanism comprising:

an engaging pin adapted for engaging with at least one side face of said rotating door to rotate said rotating door and open said opening portion with said engaging pin moving on a predetermined track in accordance with advancing of said disk cartridge, said engaging pin being movably provided for a side wall opposed to a side face of the disk cartridge;

urging means for urging said engaging pin, said urging means allowing said rotating door to be opened by moving said engaging pin against its urging force and allowing said rotating door to be closed by returning said engaging pin to a predetermined position; and wherein when said engaging pin engages with said rotating door, said engaging pin presses a lock piece locking said rotating door and said rotating door is opened while said rotating door is being brought into a locked state.

11. The door opening and closing mechanism according to claim 10, wherein said lock piece is urged in a direction of locking said rotating door; and wherein said urging force of said urging means is set to be larger than an urging force exerted on said lock piece, and while said engaging pin is pressing said lock piece, a lock release state of said rotating door is maintained.

* * * * *